United States Patent [19]

van der Lely

[11] Patent Number: 4,515,221
[45] Date of Patent: May 7, 1985

[54] TRACTOR HAVING GUIDANCE SYSTEM

[76] Inventor: Cornelis van der Lely, 7, Brüschenrain, Zug, Switzerland

[21] Appl. No.: 305,271

[22] Filed: Sep. 24, 1981

Related U.S. Application Data

[63] Continuation-in-part of Ser. No. 004,541, Jan. 18, 1979, abandoned.

[30] Foreign Application Priority Data

Jan. 19, 1978 [NL] Netherlands ............... 7800648

[51] Int. Cl.³ ......................................... A01B 69/04
[52] U.S. Cl. ........................................ 172/3; 33/318; 73/178 R; 180/131; 318/587
[58] Field of Search ................. 172/2, 3, 4.5, 23, 26; 180/79, 79.1, 131, 142, 167, 168; 33/318, 320; 305/35 EB; 56/10.2; 73/178 R, 178 T, 178 H, 504; 318/582, 587

[56] References Cited

U.S. PATENT DOCUMENTS

| | | | |
|---|---|---|---|
| 2,674,332 | 4/1954 | Ovshinsky | 180/79.1 |
| 2,739,017 | 3/1956 | Arps | 305/35 EB |
| 2,762,123 | 9/1956 | Schultz et al. | 318/582 X |
| 3,107,128 | 10/1963 | Ruane | 305/35 EB |
| 3,127,774 | 4/1964 | Fischer et al. | 73/504 |
| 3,140,436 | 7/1964 | Hatch | 318/489 |
| 3,440,889 | 4/1969 | Schaberg | 74/5.6 |
| 3,507,349 | 4/1970 | Comer et al. | 180/168 |
| 3,509,765 | 5/1970 | Stevenson, Jr. et al. | 73/178 R |
| 3,606,933 | 9/1971 | Rushing et al. | 172/3 X |
| 3,633,003 | 1/1972 | Talwani | 33/318 X |
| 3,713,505 | 1/1973 | Muller | 180/79.1 |
| 3,715,572 | 2/1973 | Bennett | 180/79.1 X |
| 3,757,093 | 9/1973 | Licata | 73/504 X |
| 3,786,422 | 1/1974 | Lubkin et al. | 340/825.3 |
| 4,032,758 | 6/1977 | Lewis | 318/587 X |
| 4,085,440 | 4/1978 | Hose | 73/178 R X |
| 4,125,017 | 11/1978 | Dhuyvetter et al. | 73/178 R |
| 4,179,818 | 12/1979 | Craig | 73/178 R X |

FOREIGN PATENT DOCUMENTS

| | | |
|---|---|---|
| 1915477 | 10/1969 | Fed. Rep. of Germany ........ 33/320 |
| 2020220 | 11/1971 | Fed. Rep. of Germany . |
| 2364002 | 7/1975 | Fed. Rep. of Germany . |
| 2251048 | 6/1975 | France . |
| 2305771 | 10/1976 | France . |
| 2333303 | 6/1977 | France . |
| 2369634 | 5/1978 | France . |
| 7613082 | 6/1977 | Netherlands . |
| 746623 | 3/1956 | United Kingdom . |
| 924744 | 5/1963 | United Kingdom . |
| 1194566 | 6/1970 | United Kingdom . |
| 1259720 | 1/1972 | United Kingdom . |
| 1426316 | 2/1976 | United Kingdom . |
| 1487360 | 9/1977 | United Kingdom . |

OTHER PUBLICATIONS

KLM Royal Dutch Airlines, *Pilots Training Compendium*, "Inertial Navigation System, Theory of Operation", PTC 3.8.2, Oct. 1, 1970, pp. 2-7.
Collinson, R. P. G., "The Role of Avionics in Modern Aircraft", *Electronic and Power*, Apr. 1978, pp. 280-284.

*Primary Examiner*—Richard T. Stouffer
*Attorney, Agent, or Firm*—Penrose Lucas Albright

[57] ABSTRACT

An agricultural tractor having two longitudinally aligned back wheels on each side receiving an endless track of the "caterpillar" type and steerable front wheels which are controlled automatically by a predetermined line of travel whereby the tractor is maintained within margins equidistant from the line of travel defining a path which it is desired the tractor follow to perform agricultural operations such as plowing. The tractors's actual track is monitored and compared with the desired line of travel by programmed steering operating to correct deviations. A single gyroscope which has its axis of rotation parallel to the earth's axis of rotation stabilizes a platform, keeping it perfectly horizontal for two accelerometers, one aligned with the tractor's longitudinal center line and the other at right angles thereto. The accelerometers monitor accelerations by the tractor to establish its position relative to its starting point and to its deviations from the line of travel. The tractor's steering wheel may be used to override the automatic operation. The tractor travels back and forth along parallel paths and negotiates turns at the end of each run, each such turn being accomplished by programmed steering corrected by actual variations which occur from the programmed turn as signalled by the transverse accelerometer. Preferably, the tractor's implement is automatically raised during each turn.

19 Claims, 9 Drawing Figures

TRACTOR HAVING GUIDANCE SYSTEM

RELATED APPLICATIONS

This is a continuation-in-part of application Ser. No. 004,541 filed Jan. 18, 1979, which claims the priority of Netherlands application No. 78,00648 filed Jan. 19, 1978, now abandoned.

BACKGROUND OF THE INVENTION

The invention relates to an agricultural vehicle which is automatically steered through a program including means to correct for deviations in agricultural operations such as seeding, plowing the the like. In particular, a three-axis gimbal system carrying a gyroscope and accelerometers provides an input to a program which calibrates and compensates for errors.

Inertia guidance systems are well-known in the art and find primary use in ocean vessels and airborne and space vehicles. For example, an inertia navigation system is disclosed in U.S. Pat. No. 3,509,765 of K. M. Stevenson, Jr., et al. which issued May 5, 1970. Such system is of a type which determines position, velocity and acceleration to provide information concerning navigation of the vehicle incorporated in the system. An autopilot system for a boat which includes control means for the boat's rudder is disclosed in the U.S. Pat. No. 3,140,436 of July 7, 1964 to W. Hatch. Systems have also been used for monitoring the route traveled by a vehicle, such a system being described in a U.S. Pat. No. 3,786,422 of Jan. 15, 1974 to S. Lubkin. Another patent to R. Lewis U.S. Pat. No. 4,032,758 of June 28, 1977 directed to a compensated vehicle heading system discloses sensors for sensing a vehicle's dynamic movement and indicates acceleratormeters mounted on the vehicle may be utilized as well as gyroscopic mechaisms. Problems with responding to gyroscopes and the like have been noted in the prior art. Thus a patent to R. Schaberg U.S. Pat. No. 3,440,889 of Apr. 29, 1969 discloses a potentiometer type pickup device for a gyroscope mounted in a guided missle or other maneuverable craft which is capable of indicating movement of the craft about an axis and through more than 180 degrees in either direction from a reference heading. Other U.S. patents which indicate the state-of-the-art are U.S. Pat. Nos. 865,278; 1,067,808; 1,137,258; 1,279,471; 1,496,087; 2,342,655; 2,953,858; 3,229,376; 3,669,657; 3,753,296, and 3,911,255. In addition, attention is invited to French Pat. Nos. 2,251,048 and 2,305,771 and to Netherlands application No. 76.13082. However, the application of a programmed steering to an agricultural vehicle poses severe problems of accuracy within tolerances measured in inches both in traversing straight lines and in turning which are not present in fluid borne vehicles and which involve considerably more than simply indicating location or adherence to a predetermined route of travel.

SUMMARY OF THE INVENTION

This invention relates to an agricultural tractor which is steered along a preprogrammed course, the programmed steering responding to deviations from a path containing such course and causing the vehicle to turn into a new course at predetermined locations.

More specifically, the tractor is steered by a device which includes means for monitoring the actual position of the vehicle and for comparing the actual position with a programmed desired travel course, the tractor being automatically steered in response to a continuous assessment of the differences between actual positions and a desired path containing such course.

In addition, the tractor comprising a steering device which includes means for monitoring its position and a program which causes it to be automatically steered through a turn when a predetermined position along the path of travel is reached.

In a further aspect of the invention the tractor's steering device is preferably controllable automatically according to a preset program or by a manually operated steering member which, when operated, overrides the programmed steering.

According to a yet further aspect of the present invention there is provided a steering device for an agricultural tractor which is controllable either automatically according to a preset program or by a manually operated steering member, including a steering member that remains substantially stationary during programmed steering.

According to a still further aspect of the invention, the tractor's steering device is controlled automatically by means of a program delivered by a program generator, the program generator including a control member, actuation of which initiates a steering program.

For a better understanding of the invention and to disclose how it may be carried into effect, reference is made, by way of example, to the accompanying drawings, in which:

BRIEF DESCRIPTION OF THE DRAWINGS

FIG. 9 is a block diagram similar to FIG. 5 for the embodiment illustrated in FIG. 8.

DESCRIPTION OF THE PREFERRED EMBODIMENTS

Figure 1:
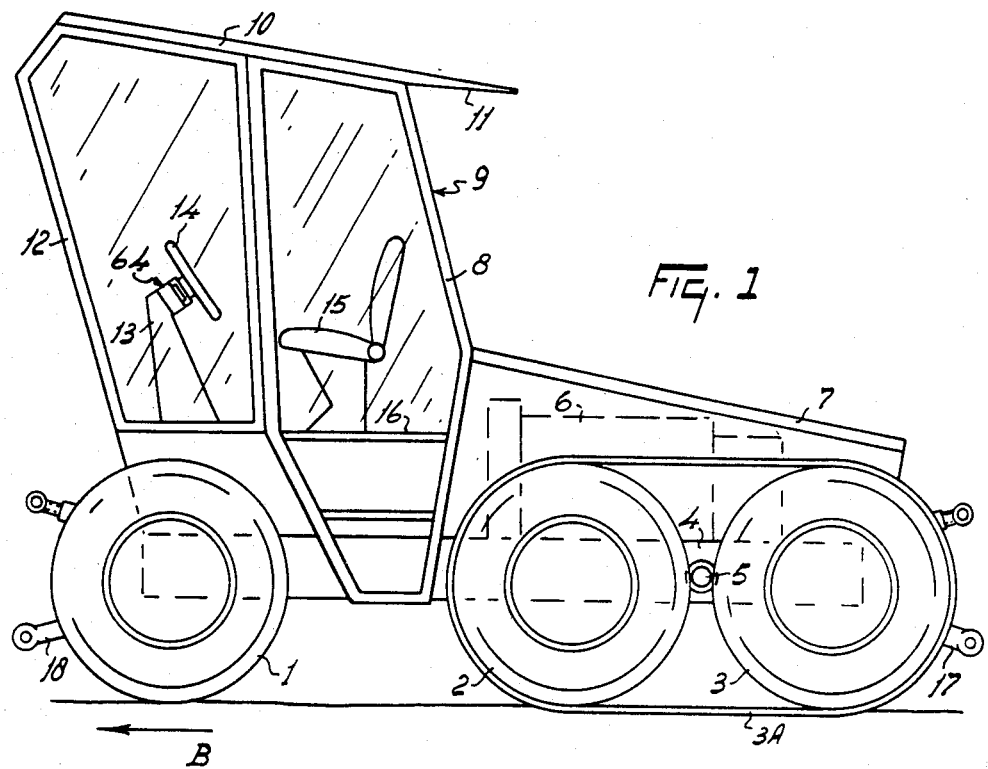
FIG. 1 is a side elevation of a tractor.

The tractor shown in FIG. 1 has front wheels 1 which can be steered in a manner to be subsequently described more fully, leading rear wheels 2 and trailing rear wheels 3. On each side of the tractor, is this embodiment, a Caterpillar type of endless track 3A extends around rear wheels 2 and 3. The rotary axles of rear wheels 2 and 3 on each side of the tractor are rotatably journalled in a wheel carrier 4, which is pivotable with respect to the tractor frame about a horizontal pivotal shaft 5 extending transversely of the intended direction of forward travel as indicated by arrow B. In this embodiment, shaft 5 is approximately midway between the wheel axles of wheels 2 and 3.

A driving engine 6 of the tractor and an associated torque converter are located in the region between rear wheels 2 and 3 on both sides of the tractor in order to minimize the risk of wheelspin and skidding by driven rear wheels 2 and 3. Such wheels 2 and 3 are driven by means of a driving mechanism arranged in the hollow wheel carrier 4. In this embodiment front wheels 1 are not driven.

Engine 6 is covered on the top by panels 7 which are inclined upwardly with respect to the direction indicated by arrow B. At the front these panels 7 join a rear wall 8 of a driver's cab 9 having a forwardly inclined glass window. The cab is situated in the region bounded by a vertical plane going through the foremost aspects of the leading rear wheels 2 and by a further parallel vertical plane going through the foremost aspects of front wheels 1.

Away from its junction with the front of panel 7, rear wall 8 of cab 9 and hence its glass rear window are inclined forwardly and upwardly. Cab 9 has a roof 10, which extends at the rear beyond its junction with rear wall 8 to form a shield 11. At the front, roof 10 terminates at a front wall 12 of cab 9, which includes a glass windshield part that is inclined towards to rear and is substantially parallel to the rear windshield in rear wall 8.

Inside driver's cab 9 an upwardly extending console 13 is provided which has a steering wheel 14. A hydraulic steering member coupled with the steering wheel 14 is accommodated in console 13. Behind console 13 there is a driver's seat 15. The internal height of cab 9 is such that the vertical distance between a floor 16 of cab 9 and the lower side of its roof 10 is sufficient for a person of normal height (about 1.75 to 1.80 meters) to stand upright in the rear part of the cabin. The tractor is provided at its rear with a three-point lifting device 17, and at its front with a further three-point lifting device 18.

Figure 2:
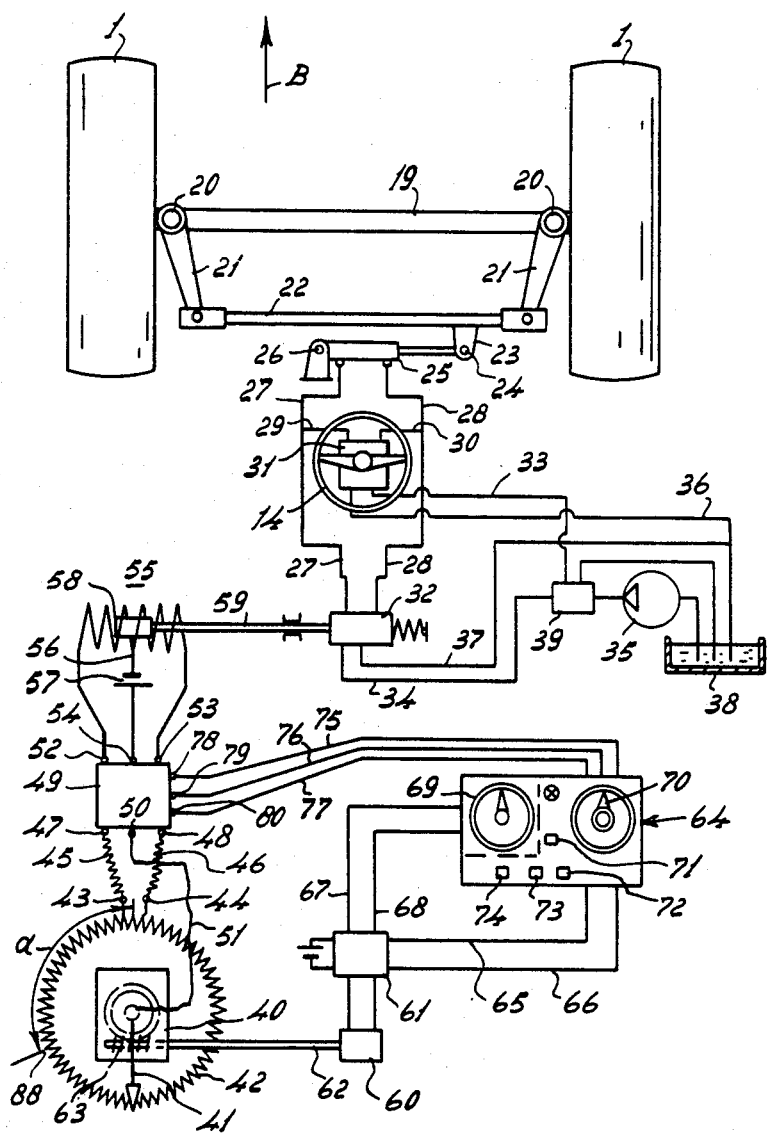
FIG. 2 is a schematic diagram showing a first embodiment of an automatic steering device for the tractor of FIG. 1.

From FIG. 2 it will be apparent front wheels 1 are pivotable with respect to a front axle 19 about upwardly extending king pins 20. The wheel stub axles are fastened to levers 21, the ends of levers 21 away from the pins 20 being intercoupled by a track rod 22 and provided with a tag 23. Tag 23 has an upwardly extending pivotal shaft 24, to which is pivoted the piston rod of a hydraulic cylinder and piston unit 25. The cylinder of hydraulic unit 25 is pivotable about an upwardly extending pivotal shaft 26, which is fastened to the tractor frame. The compartments defined in the cylinder on either side by the piston in the hydraulic unit are supplied through conduits 27 and 28 respectively with hydraulic fluid. Conduits 27 and 28 have branches 29 and 30 respectively, opening out in a hydraulic steering member 31, which is controlled by steering wheel 14. As indicated above, hydraulic steering member 31 is accommodated in console 13.

Conduits 27 and 28 are connected at their ends away from cylinder 25 with a hydraulic control valve 32. Hydraulic steering member 31 as well as hydraulic control valve 32 are supplied through conduits 33 and 34 respectively with hydraulic fluid which has been pressurized by a hydraulic pump 35. Fluid flowing away from steering member 31 and control valve 32 respectively is fed back through conduits 36 and 37 respectively to a fluid sump or reservoir 38. Between pump 35 and pressure conduits 33 and 34 there is a hydraulic control member 39 which serves as a flow rate distributor and as a pressure relief valve.

Control valve 32 has a lower hydraulic flow rate than steering member 31 and applied hydraulic signals to steering member 31 through conduits 27 and 28 and conduits 29 and 30 respectively. The signals emanating from control valve 32 are controlled by an automatic steering program which will subsequently be described more fully. Steering member 31 is of a conventional type and can be manually controlled by operation of steering wheel 14 at any time in the automatic steering program. When steering wheel 14 is stationary, its hydraulic communication with control cylinder 25 is blocked so that this cylinder only responds to the automatic program which is transmitted by control valve 32. Turning of steering wheel 14 results in movement of control cylinder 25 over and above that caused by the automatic program. Therefore, the manually operated steering can override the programmed steering transmitted by control valve 32. Consequently manual correction can be carried out at any time.

A type of steering which may be utilized in the instant invention has been available commercially under the trademark "ORBITROL" by Danfoss. Such steering is used on mobile cranes, excavators, road rollers, forklift trucks, tractors, combine harvesters, etc., as well as in fishing boats and small marine vessels. A Danfoss brochure (150-.3.03.02/2-1967) discloses a single steering system of the type involved in the instant invention. With such system, deviation of the steering wheel from its neutral position in the amount of 6° is sufficient to open the hydraulic fluid outlet ports fully and further deviation controls the volume of fluid per unit of time in a manner proportional to that of the amount of deviation. The volume per unit time is such that it exceeds the volume of fluid supplied by the control valve 32 so that the steering cylinder 25 will always respond to the steering wheel when used to override the automatic control. Back pressure of the steering unit through lines 27 and 28 does not influence the position of valve 32 due to the nature of that valve.

The tractor is provided with a gyroscope 40 mounted on the tractor frame in a freely movable manner in gimbals. Preferably gyroscope 40 is disposed near or at the tractor's center of gravity. The gyroscope's rotor rotates about a horizontal axis in the North-South direction and, more particularly, parallel to the direction of the rotary axis of the earth. The pivotal shaft between the two gimbal rings is provided with a sliding contact 41 which is in sliding electrical conduction with a potentiometer 42 having a large number of turns. Potentiometer 42, as shown in FIG. 2, is circular and has two adjacent terminals 43 and 44 defining together a plane of symmetry of potentiometer 42.

Potentiometer 42 is coaxial with the axis of rotation of sliding contact 41, about which the latter turns with respect to the rest of the tractor. Connecting terminals 43 and 44 of potentiometer 42 are connected by leads 45 and 46 respectively to inputs 47 and 48 respectively of an amplifier 49. A third input 50 of amplifier 49 is connected through a lead 51 to sliding contact 41, which is electrically insulated from the gyroscope.

Amplifier 49 has three outputs 52, 53 and 54, which correspond with inputs 47, 48 and 40 respectively of amplifier 49. To outputs 52, 53 and 54 is connected a differential coil 55 which has a central tap 56 connected through a voltage source 57 with output 54 of amplifier 49. With respect to the central tap 56, coil 55 is electrically symmetrical. The two ends of the two halves of coil 55 on each side of central tap 56 are connected to outputs 52 and 53. Within the turns of the coil 55 there is a spring-loaded core 58 which is axially displaceable. The core is displaceable with respect to the coil as a result of magnetic fields produced in the two coil halves. Core 58 is mechanicaly connected, for example, by a rod 59 shown schematically in FIG. 2, with the slide of the control valve 32.

Near potentiometer 42 there is a stepping motor 60 which is rotated by pulses originating from a pulse generator 61. The output shaft 62 of a motor 60 is connected, by a worm and worm wheel drive 63, to turn potentiometer 42 about a shaft around which the turns are coaxially disposed.

Pulse generator 61 is coupled with a program generator 64 (with a microprocessor) through leads 65, 66 and leads 67 and 68 to a direction indicator 69. Program generator 64 and direction indicator 69 are arranged together on console 13 within the driver's reach.

Program generator 64 comprises a rotatable setting knob 70 provided with a pointer, an on/off knob 71 for switching on or off the entire automatic steering system, a push button 72 for inserting a steering program, a push button 73 for starting the steering program and a push button 74 for repeating a previously introduced steering program. The program generator 64 has feedback lines 75, 76, 77 connected to inputs 78, 79 and 80, respectively of amplifier 49.

Figure 3:
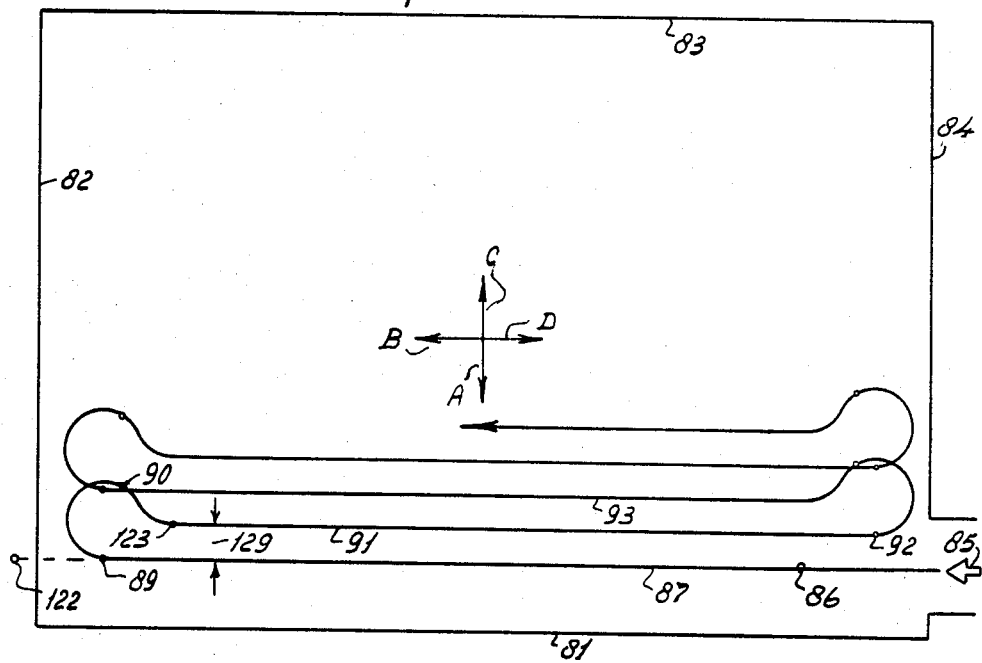
FIG. 3 is a plan view of a field over which the tractor is to travel, indicating the course of the tractor.

FIG. 3 illustrates a field to be covered by the tractor, its boundaries designated by 81, 82, 83 and 84. The entrance to the field is designated by 85. Having entered the field, the tractor is stationary at a location indicated by numeral 86, which is the starting point of the working course. At location 86, while the tractor is stationary, the desired direction of travel is determined; it is indicated in FIG. 3 by a course 87 which is parallel to field boundary 81. This direction corresponds with the direction B-D indicated in FIG. 3, whereas the direction A-C in the direction perpendicular to the direction B-D. Direction A-C corresponds in FIG. 3 with the directions of field boundaries 82 and 84. The direction on the course 87 is set by means of program setting knob 70. Previously the on/off knob 71 has been depressed so that the gyroscope 40 has been brought up to speed. Then the program starting knob 73 is depressed whereby pulse generator 61, step motor 60, potentiometer 42 and amplifier 49 are supplied with electrical current. By switching on program setting knob 70, pulse generator 61 is activated through the leads 65 and 66 and provides pulses to step motor 60 for a given duration of time determined by the position of the setting knob 70, step motor thus rotating during said time and causing potentiometer 42 to rotate by means of worm gear 63. Potentiometer is stopped at the end of that period of time during which pulse generator 71 produces pulses, so that in the plane of symmetry determined by connecting terminals 43 and 44, potentiometer 42 occupies a position which has a fixed relationship to the adjusted position of setting knob 70. This position of the plane of symmetry of potentiometer 42 is designated in FIG. 2 by reference numeral 88. The plane of symmetry is then at an angle $\alpha$ to the point located diametrically opposite sliding contact 41.

When the tractor is moving, the resistance of the potentiometer windings between sliding contact 41 and connecting terminal 43 (which is in position 88 like the connecting terminal 44) differs from the resistance between the sliding contact and connecting terminal 44 because the number of turns of the potentiometer is different in the two directions. The current supplied through lead 51 will, therefore, be distributed unevenly between the two potentiometer branches whereby at inputs 47 and 48 the amplifier receives different input currents. The amplifier 49 amplifies these currents and hence also their difference value so that the currents flowing through the two coil halves via outputs 52 and 53 of the amplifier are also different. Owing to the different magnetic field strength in both halves of coil 55, core 58 moves out of a symmetrical position relative to coil 55 and through the mechanical connection 59 it moves hydraulic control valve 32. Pressurized hydraulic fluid from pump 35 is then provided to hydraulic steering member 31. If steering wheel 14 is not actuated by the driver, signals emanating from valve 32 independently energize unit 25. As a result of this energization, front wheels 1 are turned about pins 20 and the moving tractor is steered in a turn about its vertical axis.

When step motor 60 is stationary, potentiometer 42 is firmly maintained in its relative position with the tractor. Therefore, when the tractor turns about its vertical axis, the plane of symmetry 88 of the potentiometer also turns with respect to sliding contact 41, because sliding contact 41 is fastened to the gyroscope and so maintains its adjusted direction. The plane of symmetry of potentiometer 42 moves during the tractor turning evolution until connecting terminals 43 and 44 are returned into the position shown in FIG. 2, where the electrical currents received through the potentiometer branches on either side of sliding contact 41 are again equal whereby core 58 and hence the slide of valve 32 return to the central position and the tractor's wheels again occupy a position for straightforward travel. In this way the tractor turns through the angle with respect to a fixed direction determined by the gyroscope. The angle $\alpha$ is, of course, the same as that set by knob 70. Therefore, immediately after leaving the starting point 86 the tractor turns to face the direction set by the knob 70. This adjusted position is applied to the direction indicator 69 through lines 67 and 68 connected to the pulse generator 61. Potentiometer 42, the sliding contact and the gyroscope constitute, therefore, a monitor for the tractor'S position.

When driving along course 87 (FIG. 3), the tractor is generally coupled with an implement, for example, a plow hitched to the rear lifting device 17. When driving on uneven ground, and owing to forces exerted by the ground on the plow shares, the tractor is continuously subjected to forces tending to deflect it away from the straight course 87. However, any deviation from this straight line is detected because sliding contact 41, which always points in a fixed direction owing to the stationary position of the gyroscope, shifts along the potentiometer which is rigidly affixed to the tractor. Any deviation of sliding contact 41 from the plane of symmetry of the potentiometer produces unequal currents through the two potentiometer branches resulting, subsequent to amplification in the amplifier 49, in a displacement of core 58 with respect to the coil halves of the coil 55 whereby, through control valve 32, steering device 31, and the unit 25 corrective movement of front wheels 1 around pins 20 occurs to return the tractor to the straight course 87. During this return of the tractor to course 87, current differences of the potentiometer branches decrease gradually and, therefore, the displacement of core 58 with respect to its position of symmetry in coil 55 is gradual so that oversteering is avoided. Consequently, the tractor automatically follows course 87.

At the predetermined end of course 87 (terminal point 89, FIG. 3) the tractor is stopped by the driver in order to program a sharp turn at the side of the field. The setting knob 70 is then set for a turn of, for example, 210° corresponding to the circumferential angle bounded in FIG. 3 by points 89 and 90. This turn is introduced by means of knob 72 into the program and stored in memory. Subsequently the program staring knob 73 is depressed and the tractor is restarted. During the depression of programming knob 72 a signal can be added for lifting the lifting device 17 whereby the implement, in this case a plow, is lifted. When the tractor starts, it will immediately turn about the vertical axis through the adjusted 210°, because at the point 89 potentiometer has been turned through said angle with respect to the sliding contact by pulse generator 61 and step motor 60. The radius of the turn is fixed, for example, by the engagement of levers 21 against a stop and the length of the bend by the magnitude of the adjusted angle. The turn through the angle may be checked by observation of the direction indicator 69. When the tractor reaches point 90, it is again stopped and setting knob 70 is turned back through the angle of 30°, after which programming knob 72 and program starting knob 73 are depressed and the tractor is restarted. Turning back setting knob 70 through 30° results, of course, in another turn of the potentiometer 42 with respect to the sliding contact 41 by means of the pulse generator 61 and step motor 60 so that after starting, the tractor turns back through a bend of 30° and then is steered to travel straight on a course 91, which is parallel to the course 87. The distance measured in the direction A-C between course 87 and course 91 is, therefore, determined by the magnitude of the circumferential angle between points 89 and 90, which is selected to be 210°, in this embodiment. The terminal point for course 91, located near the field boundary 84, is indicated by reference numeral 92. When the tractor arrives at this point, the driver depresses repetition knob 74 so that the bend program in the memory of program generator 64 starts (but in the reverse sense) resulting in a run along a further course 93, which is parallel to courses 91 and 87.

The driver repeats the depression of the repetition knob at every arrival at the edge of the field. The program generator contains an instruction to reverse the sense of the bend at each repetition. It should be noted during programmed steering, steering wheel 14 remains stationary. It is thus possible for the operator to cause, without difficulty, by merely overriding control valve 32, the tractor to follow accurately parallel, straight paths.

To what extent the operator substitutes manual for automatic control depends on the quality requirements for the job to be accomplished. For example, in the case of a seed drill, it is important to ensure the rows of plants are accurately straight and parallel to one another because this is most important for subsequent treatments of such rows of plants by machines which pass between the rows in row-crop farming. In harvesting, losses due to failure to provide parallel rows are thus minimized. Nevertheless, the automatic controls permit the tractor's operator to oversee the general functioning of the tractor, and, in particular, to give more attention to performance of the implement hitched to the tractor.

The above embodiment is directed essentially to an automatic heading control for the tractor, wherein the heading is governed by gyroscope 40. By periodically reversing the tractor's heading and course 180° certain causes, otherwise disposed to affect accuracy of gyroscope 40, tend to cancel each other. In addition, the embodiment is advantageous with tractors and agricultural fields where there is minimal side slippage by the tractor.

Figure 4:
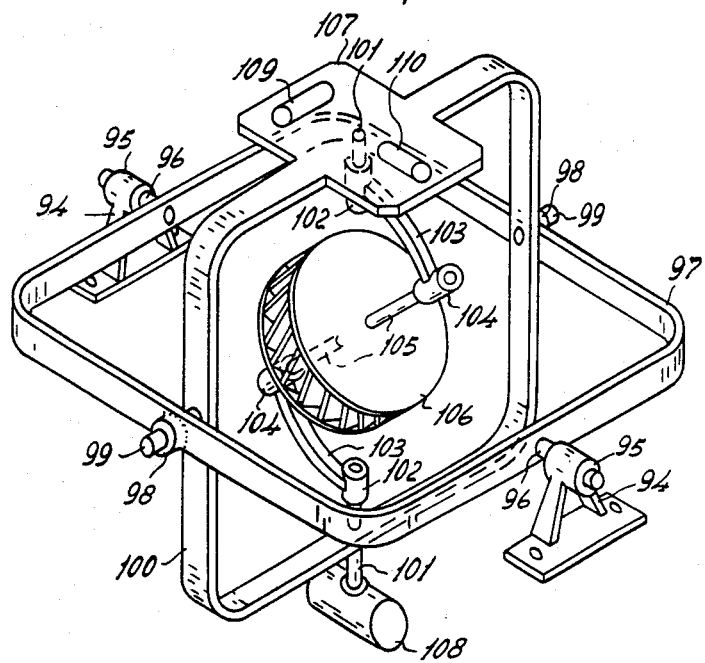
FIG. 4 is a schematic perspective drawing of a monitor of a second embodiment of steering device.

In a second embodiment of an automatic steering device for controlling a tractor's operations in an agricultural field, a monitor, as shown in FIG. 4, for the position of the tractor is preferably disposed near or at the tractor's center of gravity.

The monitor is mounted by two relatively spaced coaxial bearings 95 on supports 94 which are rigidly secured to the tractor's frame. Bearings 95 receive aligned shafts 96, which are rigidly secured to a gimbal ring 97, which is horizontal in a central position. Arranged in ring 97 are bearings 98 receiving aligned shafts 99, which are fastened to a further gimbal ring 100. Shafts 99 are perpendicular to shafts 96 and are horizontal in their central positions. The common centerline of aligned shafts 99 intersects the common centerline of aligned shafts 96. Gimbal ring 100 is parallel to a vertical plane which coincides with the tractor's vertical longitudinal plane of symmetry when the tractor is on level ground. Under these conditions, shafts 96 are perpendicular to the tractors's vertical plane of symmetry. To ring 100 are fastened aligned vertical shafts 101, the common centerline of which intersects those of shafts 96 and 99 at a common single point. At its end away from its fastening point on ring 100, each shaft 101 has a bearing 102. Bearings 102 are spaced apart from one another. The outer rings of bearings 102 hold curved supports 103 which project from the associated bearings 102 on different sides of the tractor's longitudinal plane of symmetry of and support at their ends away from the bearings 102, the outer races of bearings 104. The centerlines of the bearings 104 coincide and are inclined to the common centerline of shafts 101. Each of the two bearings 104 is journalled a shaft 105 of a gyroscope rotor 106, shaft 105 extending between bearings 104. Rotor 106, supported by shaft 105, is located midway between bearings 104 and the center of gravity of the assembly of shaft 105 and rotor 106 is accurately located on the common centerline of the shafts 101 at such centerline's point of intersection with the centerline of shafts 96, 99 and 101.

Where one of shafts 101 is connected to ring 100 there is a platform 107, and at the opposite side of ring 100 there is a weight 108. The mass of weight 108 is such that the center of gravity of the assembly comprising ring 100, platform 107, that of the accelermeters, described later, arranged thereon, and that of the weight 108, is located at the point of intersection of the centerlines of shafts 96, 99 and 101. Rotor shaft 105 and rotor 106 are, therefore, freely pivotable with respect to shafts 101.

Platform 107 is provided with a longitudinal accelerometer 109 measuring accelerations in a horizontal direction and in a vertical reference plane coinciding with the vertical longitudinal plane of symmetry of the tractor, when it is standing on level ground, and also with a transverse accelerometer 110 measuring accelerations in a horizontal direction perpendicular to said reference plane. Accelerometers 109 and 110 are of known type, for example, in the form of piezo-electrical crystals.

Figure 5:
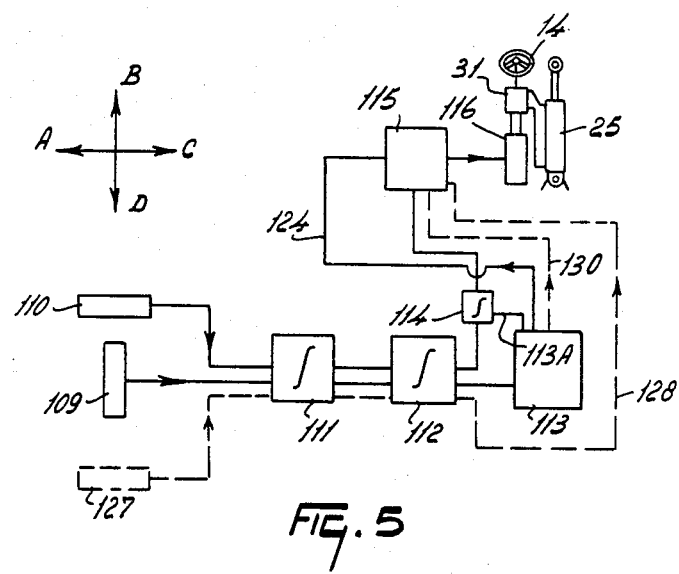
FIG. 5 is a block diagram of an automatic steering device including the monitor of FIG. 4.

As shown in the block diagram of FIG. 5, the output signals of accelerometers 109 and 110 are applied to an integrator 111. Output signals of this integrator are a measure for the speed of the center of gravity of the tractor in its direction of travel (direction B or D, see FIG. 3) and for the speed of the center of gravity of the tractor transverse of the direction of movement (direction A or C, see FIG 3). These speed signals are applied to a second integrator 112. Output signals of integrator 112 are a measure of movement by the tractor's center of gravity in the direction B or D and of movement by the tractor's center of gravity in a direction at right angles to the reference plane, viewed from the starting point 86 (FIG. 3), when point 86 is chosen to represent the zero point. Output signals of integrator 112 originating from the accelerometer 109 are applied to a signal generator 113, which comprises a counter assessing the total net distance covered in the direction of the tractor's forward movement. The signals originating from accelerometer 110 at the output of the integrator 112 are again applied to an integrator 114, which transmits the integral of the net distance covered in directions transverse to the tractor's forward movement appearing at its output to an arithmetic unit 115. Unit 115 applies the signals received by it, if necessary through a power amplifier for example, to relays actuating the slide of a hydraulic control valve 116. Control valve 116 is disposed in the same manner as valve 32 of FIG. 2 and is connected through steering member 31 with hydraulic cylinder 25, which steers the front wheels 1. As before the driver can override signals applied by control valve 116 by operating steering wheel 14.

Figure 6:
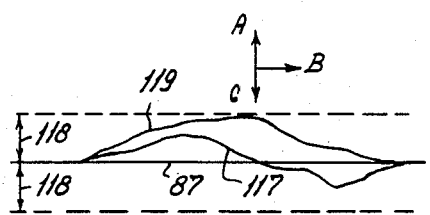
FIG. 6 is a diagram indicating the relationship between an actual travel course and a desired travel path.
Figure 7:
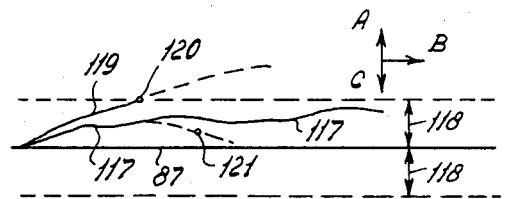
FIG. 7 is a further diagram indicating the relationship between an actual travel course and a desired travel path.

During travel in direction B, as is shown in FIG. 6, deviations from the desired, rectilinear line of travel or course 87 will occur. FIG. 6 shows the actual track 117 followed by the tractor. Output signals from unit 115 are fully suppressed within paths defined by margins 118 (FIG. 6) on either side of the desired line of travel 87 in the direction A or C. While the deviation remains within this path as defined by such margins, the slide of valve 116 does not respond. The magnitude of the margins 118 on both sides of the desired line of travel 87 is a factor which is adjustable by unit 115. The magnitude of margins 118 corresponds to the response sensitivity of the automatic steering system and it is provided in order to avoid excessively rapid responses by front wheels 1 to deviations and hence to avoid highly unsettling, jerky steering and oversteering. As stated above, unit 115 receives signals from integrator 114, which correspond to the integral of deviations in directions A or C, respectively at right angles to the desired line of travel 87. This integrated path is designated in FIG. 6 by reference numeral 119. As long as the integrated signal 119 stays within margins 118 set in this direction, no signal appears at the output of unit 115 and steering cylinder 25 is not operated. Therefore, the steering system, as such, does not respond to slight deviations transverse of line of travel 87, which regularly occur randomly to both sides thereof within the defined path, which are of comparatively small magnitudes and which approximately compensate one another with respect to line of travel 87. If, however, a deviation to one side of the line of travel 87, even a small one, has a sufficiently long duration, a directional deviation of increasing seriousness with respect to the desired line of travel 87 may persist. Such deviation from the actual line of travel 117 from desired line of travel 87 is traced in FIG. 7 as well as a representation of the integrated track 119 introduced into the unit 115. In this case the integrated track deviation in direction A moves beyond the margin 118 and thus outside of the desired path at a point 120, although the actual track remains within the margin. When point 120 is reached in integrated track 119, unit 115 applies an output signal to control valve 116, which corrects wheels 1 by means of steering cylinder 25 to the extent the actual track is corrected into a line of travel 121 indicated by broken lines. By using the integral of the actual track as a control, an effective response of the steerable wheels to deviations from desired line of travel 87 is obtained whereby the tractor is at all times maintained within the desired path.

The desired line of travel 87 can be set initially at entrance 85 with the aid of a unique direction indication by a beacon 122, which is disposed at or slightly outside field boundary 82 in line with the desired line of travel 87. A beacon may be temporarily erected at point 86 so that at entrance 85 the driver is in a position, for example, with the aid of a direction finder, to position the vertical longitudinal plane of symmetry of the tractor in coincidence with the vertical plane containing the line of connection between the beacons 86 and 122. Earlier the gyroscope has been brought up to a speed of at least 10,000 rpm in the proper disposition with platform 107 horizontal and with shaft 105 parallel to the earth's axis of rotation. It is important that the configuration of brackets 103 be such that the angle between the centerline of the rotor shaft 105 and the common centerline of the shafts 101 is accurately equal to 90° minus the angle corresponding to the geographical latitude of the region where the tractor is used whereby platforms 107 together with accelerometers 109 and 110 are continually maintained perfectly horizontal. So that the centerline of rotor shaft 105 is continually parallel to the earth's rotary axis, brackets 103 may be adjustable whereby the angle between rotor shaft 105 and the centerline of the shafts 101 can, within limits, be varied and the direction of the rotor shaft 105 is made parallel to the direction of the earth's rotary axis irrespective of the geographical latitude where the tractor is to be used, for example, in the United States or Europe. As a result of so calibrating the direction of rotor shaft 105, corrections which might otherwise become necessary as a result of rotation of the earth during the period necessary to complete the agricultural task at hand and as a result of the distance thus covered on the global surface become redundant. Hence, stabilization of platform 107 is achieved in a simple manner. This is, with the direction of rotor shaft 105 so maintained, the top of platform 107 remains accurately horizontal and means otherwise required to correct indications of accelerometers 109 and 110 due to the effects of gravity are eliminated. Because supports 94 are secured to the tractor frame, turning of the tractor 1 results in a like turn of ring 97 and ring 100 whereas gyroscope rotor 106 and shaft 105 deflect with respect to the rest of the tractor due to the circumstance that supports 103 are freely rotatable by means of bearings 102 with respect to shafts 101. The centerline of shafts 99 remains in the vertical longitudinal plane of symmetry of the tractor and the plane of ring 100 remains vertical. Movements of the tractor relative the centerline of shafts 96 and also those about the centerline of shafts 99 do not effect the vertical disposition of shafts 101 or the horizontal disposition of the top surface of platform 107.

After initial adjustment of the tractor with respect to beacon 122 (or beacons 86 and 122) the tractor is set in motion and course 87 is followed along a path within the two margins 118 in the manner described above.

The distance between points 86 and 89 (FIG. 3) has been previously accurately measured and its length is registered as the final value in the above-mentioned counter arranged in signal generator 113. When the tractor arrives at point 89, the net distance of the tractor's track covered in the direction B counted by the counter corresponds with this predetermined value of the measured length between points 86 and 89. The counter is arranged so that it then stops and is reset, while the application of the signal emanating from integrator 114 to unit 115 is stopped by the signal generator 113 (line 113A). At the same instant a previously programmed turn signal is produced in signal generator 113, this signal being as a function of time, equal to a signal at the output of integrator 112, which would have been produced by accelerometer 110, if the tractor had made a turn the same as the desired turn between point 89 and the terminal point 123 but in the opposite sense. The turn is in two parts, from point 89 to point 90 and from point 90 to point 123, the latter part being in an opposite direction compared to the first part. This signal is introduced via the line 124 (FIG. 5) into unit 115, which assesses in this case, after the counter of signal generator 113 stops, deviations from the desired bend programmed in the signal generator and applies correction signals to control valve 116. Contrary to the behavior of unit 115 during the tractor's forward travel, during which an integrated track is kept within margins, a desired turn track without margins is selected to provide high accuracy for travelling through a curve. Therefore, the output of unit 115 applies a steering signal to the control-valve 116 whereby the tractor faithfully follows the curve indicated in FIG. 3 between the points 89 and 123 by means of the steering cylinder 25. The tractor's center of gravity is thus maintained on the desired curve completely independently of any skidding of the tractor's wheels with respect to the ground. Accordingly, with correct programming of signal generator 113, the tractor's center of gravity is brought to point 123 and its direction at such point is precisely parallel to the direction of the desired line of travel 87.

At the end of the artificial signal produced as a function of time in signal generator 113 during travel through the turn from point 89 to point 123, the signal of accelerometer 109 is again allowed via integrators 111 and 112 into signal generator 113, after which the path of track 91 (FIG. 3) is covered in the same way as the path of track 89 described above. Inasmuch as the distance between points 123 and 92 (FIG. 3) is equal to the distance between points 86 and 89, the counter in signal generator 113, which starts counting again at point 123, again counts the predetermined distance between points 86 and 89. When the tractor arrives at point 92, at which instant the input signal of signal generator 113 originating from accelerometer 109 is again blocked and the artificial signal for travelling through the bend is again produced in signal generator 113, but in the opposite sense, that is to say, with the inverse sign the turn by the tractor takes place as shown in FIG. 3. After each field length has thus been covered, a signal is applied alternately with different polarities via line 124 to unit 115.

In the foregoing emboiment, the function of gyroscope 106 is to maintain platform 107 and therefore accelerometers 109 and 110 precisely level. The line of travel of the vehicle is originally programmed by the original alignment of the tractor at entrance 85 with beacons 86 and 122. Thereafer control is effected by means of accelerometers 109 and 110 to maintain the tractor's travel along a path containing line of travel 87. This is so even if the tractor's heading may be affected because of the nature of the field being worked or due to influence of the agricultural implement or implements connected to the tractor.

Figure 8:
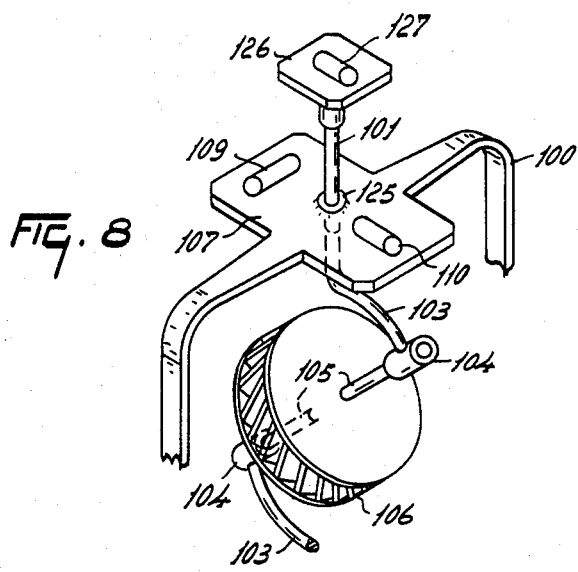
FIG. 8 illustrates an alternative embodiment for part of the monitor of FIG. 4.

FIG. 8 illustrates a further refinement of this automatic steering system. Bearings 102 are omitted and supports 103 are rigidly secured to shafts 101. Shaft 101 is pivotable by means of bearings 125 with respect to ring 100 and platform 107, the bearing 125 being arranged in ring 100. Shaft 101 projects through one of bearings 125 above platform 107 and carries at its top a platform 126, which is perpendicular to shaft 101 and hence parallel to platform 107. Platform 126 is pivotable about the centerline of the shaft 101 and can be affixed in a plurality of positions relative to shaft 101. This adjustability is accessible from the outside (not shown). Platform 126 is provided with an accelerometer 127, which measures accelerations in a horizontal direction orthogonal to line of travel 87. Owing to this adjustability of platform 126 the measuring direction of accelerometer 127 can be set in a fixed position relative to the direction of the earth's axis (the direction of the plane containing the centerlines of the shafts 101 and 105) for measuring in a direction perpendicular to that of the desired lines of travel 87, 91, 93. This additional accelerometer 127 is indicated in FIG. 9 and is also connected to integrators 111 and 112, which for this purpose each have an additional channel. The output signal of integrator 112 from the channel corresponding to the accelerometer 127 is applied via the line 128 indicated by broken lines to unit 115.

With the tractor set at point 86 accurately in the direction of the desired line of travel 87 and with the angle between the measuring direction of accelerometer 127 and the plane going through shafts 101 and 105 adjusted so that this measuring direction is directly perpendicular to track 87, such measuring direction is maintained by accelerometer even during turning because it is coupled with the gyroscope and the tractor turns about the centerline of shafts 101 with respect to accelerometer 127. During travel along the track between points 86 and 89 (FIG. 3) accelerometer 127 measures the same value as the accelerometer 110, but, whereas the signal of accelerometer 110 is replaced during the run through the turns by the artificial signal, accelerometer 127 continues measurng the accelerations in the direction A-C during such turns. When the tractor has arrived at point 123, the output of the integrator 112 corresponding to accelerometer 127 has a value corresponding to the actual distance displaced between tracks 89 and 91 indicated in FIG. 3 by reference numeral 129. Such desired distance between the tracks 87 and 91 (for example, 0.75 meters in this case of plow) is previously set in signal generator and is inserted through a line 130 (FIG. 5) into unit 115 after the termination of the turn at point 123. The actual measured value emanating from accelerometer 127 is then used for comparison in unit 115 with the desired value set in signal generator 113, the latter value setting a datum (track 87 in FIGS. 6 and 7) along which the tractor automatically steers. In other words, the distance signalled by accelerometer 127 establishes the actual position of the tractor within margins 118 for corrective action, if necessary, to maintain the tractor's travel along line of travel 91, albeit within margins 118.

For the desired track 93 the desired value of the distance 129 is multiplied by a factor of two after the second turn starting at point 92 is made.

The automatic steering program terminates after a previously determined number of turns, this number being counted by a separate counter in the signal generator 113.

The signal produced at points 89 and 123 and terminated respectively in the signal generator 113 is preferably coupled with a pulse generator for lifting or lowering the implement respectively by actuating the lifting device 17 or 18 or both. In this way a very accurate automatic steering system and a method of carrying out agricultural tasks with aid of a tractor are obtained, in which the driver need not exert any control and, indeed, may be absent. If the driver is present, he can stand upright in the rear part of the tractor to observe the behavior of the hitched implement or implements. Also, with the implement lifted during the turn, the tractor's speed is not influenced by fluctuating ground forces on the implement and the speed is more accurately defined by the setting of the tractor's torque converter.

The programming of data comparisons provided through sensors such as the accelerometers 109, 110 and 127 (and by their integrators) through microprocessor systems involves commonplace techniques for persons skilled in the electronic systems art. Microprocessors of the 6800 Series, the 8080 Series and the 2650 Series, and supporting hardware and software therefor, which are commercially available may be used. Persons skilled in the electronic systems art will understand the automatic steering device disclosed herein and in patent application Ser. No. 004,541 will normally include: (1) a microprocessor; (2) an in-and-out communication with the operator, initializing the automatic functioning of the vehicle; (3) a fixed monitoring program stored in a ROM or an EPROM; (4) a read-write memory (RAM) for storing variable program parts applicable to the work immediately at hand, data to be used for such work as a scratchbook for data provided by the sensors (directly or indirectly) prior to or subsequent to being processed or both by the microprocessor, as considered necessary; and (5) in-and-out ports for taking in data from the sensors (or its integrators) and providing the necessary functions to operate the tractor in a desired manner.

It is important that there be absolute accuracy in measuring horizontal accelerations by the accelerometers 109, 110 and 127. It will be appreciated that the two extremely sensitive accelerometers 109 and 110, which are disposed 90° relative to each other, provide measurements in magnitudes of the total tractor accelerations in transverse and longitudinal directions, respectively. By integrating such accelerations with respect to time, velocity is obtained and by integrating this first integral of acceleration (i.e. velocity), distance is obtained.

It is important the accelerometers be kept horizontal constantly. Even a slight tilt introduces a component of the earth's gravitational field and an incorrect acceleration is thus measured.

The instant inertial navigation system for tractors utilizes only one gyroscope and is relatively inexpensive. Many instruments required in commercial gyroscopes for corrective purposes have been eliminated by making the spin axis parallel to the earth's spin axis wherever the tractor is used.

The system is intended generally for farming in temperate zones wherein an axis parallel to the earth's axis is neither horizontal or nearly so nor vertical or nearly so. When a system in accordance with the instant invention is operated near the equator, side-to-side rolling by the tractor is not detected with the tractor travelling North or South. On the other hand, when operated near the North pole, yaw by the tractor is not detected. Thus, the instant invention has its major usefulness in agriculture in latitudes 25°–65° North and South and preferably between latitudes 30° and 60° North and South.

Although various features of the tractor described and illustrated in the drawings, will be set forth in the following claims as inventive features, it is to be understood the invention is not necessarily limited to these features and may encompass all of the features that have been disclosed both individually and in various combinations.

Having thus described my invention, what I claim as new and to be secured by Letters Patent of the United States is:

1. An agricultural tractor having an automatic steering device including at least one accelerometer which generates signals responsive to side-to-side motion of the tractor, said accelerometer carried by said tractor in a horizontal position transverse to the tractor's normal direction of travel, said accelerometer being stabilized in its horizontal position by at least one gyroscope, the axis of rotation of said gyroscope being virtually parallel to the earth's axis of rotation.

2. An agricultural tractor in accordance with claim 1 wherein a further accelerometer is carried by said tractor which is stabilized in a horizontal position by said gyroscope, said further accelerometer being parallel to the longitudinal axis of said tractor, said further accelerometer generating signals from which may be derived the net distance travelled by said tractor.

3. A tractor in accordance with claim 2 comprising at least one lifting device and means for automatically actuating said lifting device by signals derived from said further accelerometer.

4. A tractor in accordance with claim 1, wherein the inclindation of said axis of rotation of said gyroscope is between 25° and 65°.

5. A tractor in accordance with claim 1, wherein the axis of said gyroscope is inclined at 45° or minus 15°.

6. An agricultural tractor having an automatic steering device which comprises: a programmed desired line of travel registering means carried by the tractor; actual position monitoring means carried by the tractor which comprises means for detecting accelerations of the tractor directed normally to said desired line of travel; means for generating a signal from said acceleration detection means comprising means for continuously integratng accelerations detected by said acceleration detection means at least three times whereby the distance of the integrated track of the vehicle from said desired line of travel measured perpendicular to said desired line of travel is derived and a signal is generated for initiating corrective steering by said steering device at a predetermined detected measurement of said distance from said desired line of travel; and means causing steering action which turns said tractor through 180° to a new desired line of travel parallel to said first mentioned line of travel which is initiated when said tractor has travelled a predetermined distance along said first mentioned line of travel.

7. A tractor in accordance with claim 6 comprising a platform, wherein said acceleration detection means is carried on said platform, a gyroscope maintaining said platform in a level position, the axis of rotation of said gyroscope being parallel to the earth's axis of rotation.

8. An agricultural tractor in accordance with claim 6, wherein said tractor comprises at least one lifting device which is actuated automatically by said means causing steering action.

9. A tractor in accordance with claim 6 comprising a platform wherein said means for detecting acceleration for the tractor is directed at right angles to said desired line of travel and comprises an accelerometer, said accelerometer being carried on said platform which is maintained in a precisely level condition at all times of operation.

10. An agricultural tractor having an automatic steering device for negotiating turns which comprises: a pre-set turning program that generates artificial signals corresponding to transverse accelerations of said tractor which would occur if the tractor negotiated the turns starting at a predetermined location and without wheels slippage and ending at a further predetermined location; transverse accelerations detection means and a gyroscope mounted on said tractor, said transverse acceleration means comprising an accelerometer that measures actually occurring transverse accelerations of the tractor while turning; means for generating signals from said accelerometer, said accelerometer being maintained horizontal by said gyroscope and transverse to the tractor direction of travel by its mounting on the tractor; means for comparing said accelerometer signals with said artificial signals; and means causing corrective steering action during said turns controlled by the difference between said artificial signals and said accelerometer's signals whereby the tractor negotiates each said turn so that its location at the end of the turn corresponds to said predetermined further location.

11. A tractor in accordance with claim 10, wherein the axis of rotation of said gyroscope is at all times maintained parallel to the earth's axis.

12. A tractor in accordance with claim 10, comprising at least one lifting device which is actuated automatically by means of said pre-set turning program.

13. A tractor in accordance with claim 10, wherein said tractor carries a further accelerometer which is maintained horizontal by said gyroscope and parallel to the tractor's direction of travel by its mounting on the tractor.

14. An agricultural tractor in accordance with claim 10, wherein the inclination of the axis of rotation of said gyroscope is between 25° and 65° relative to the horizontal.

15. A tractor in accordance with claim 10, wherein the inclination of said gyroscope is 45° plus or minus 15°.

16. In an agricultrual tractor for performing agricultural functions in a restricted geographical location at a latitude between 25° and 65° from the equator, an inertia guidance system comprising a platform mounted on said tractor, a gyroscope and an accelerometer carried by said platform, said accerleometer providing guidance information responsive to horizontal accelerations, means for steering said tractor receiving said guidance information from said accelerometer, said gyroscope having an axis of rotation which is fixed parallel to the earth's axis of rotation when the system is operational to stabilize said platform and maintain said accelerometer in a level position.

17. An inertia guidance system according to claim 16, wherein a further accelerometer for providing further information responsive to horizontal accelerations is carried by said platform at right angles to said first-mentioned accelerometer, said gyroscope also maintaining said further accelerometer in a level position.

18. An agricultural tractor having an automatic steering device which comprises: a programmed desired straight line of travel registering means carried by the tractor; actual position monitoring means carried by the tractor which comprises means for detecting accelerations of the tractor transverse to said desired line of travel; means for generating a signal from said acceleration detection means comprising means for continuously integrating said transverse accelerations three times, said third integral of transverse accelerations providing a registration so that a signal is generated for initiating corrective steering by said steering device upon exceeding said registration by a predetermined margin.

19. A tractor in accordance with claim 18 comprising a platform, wherein said acceleration detection means is carried on said platform, a gyroscope maintaining said platform in a level position, the axis of rotation of said gyroscope being at an inclination relative to the horizontal which is parallel to the earth's axis of rotation.

* * * * *